United States Patent
Pillemer et al.

(10) Patent No.: US 11,481,799 B2
(45) Date of Patent: Oct. 25, 2022

(54) OUT-OF-HOME CAMPAIGN INTELLIGENCE

(71) Applicant: Kinesso, LLC, New York, NY (US)

(72) Inventors: Graeme Pillemer, Sydney (AU); Yong Rhyu, San Ramon, CA (US); Tushar Patel, San Francisco, CA (US)

(73) Assignee: Kinesso, LLC, New York, NY (US)

(*) Notice: Subject to any disclaimer, the term of this patent is extended or adjusted under 35 U.S.C. 154(b) by 0 days.

(21) Appl. No.: 16/731,604

(22) Filed: Dec. 31, 2019

(65) Prior Publication Data
US 2020/0211051 A1    Jul. 2, 2020

Related U.S. Application Data

(60) Provisional application No. 62/787,241, filed on Dec. 31, 2018.

(51) Int. Cl.
*G06Q 30/02* (2012.01)
(52) U.S. Cl.
CPC ..... *G06Q 30/0244* (2013.01); *G06Q 30/0201* (2013.01); *G06Q 30/0246* (2013.01); *G06Q 30/0276* (2013.01)
(58) Field of Classification Search
CPC .......... G06Q 30/0205; G06Q 30/0201; G06Q 30/0242; G06Q 30/0244; G06Q 30/02
See application file for complete search history.

(56) References Cited

U.S. PATENT DOCUMENTS

| | | | | |
|---|---|---|---|---|
| 6,985,882 | B1* | 1/2006 | Del Sesto | G06Q 30/02 705/27.1 |
| 2003/0061211 | A1* | 3/2003 | Shultz | G06Q 30/02 |
| 2007/0050372 | A1* | 3/2007 | Boyle | G06Q 30/02 |
| 2007/0129954 | A1* | 6/2007 | Dessureault | G06Q 30/02 705/333 |
| 2008/0021777 | A1* | 1/2008 | Mack | G06Q 30/0276 705/14.1 |
| 2009/0030788 | A1* | 1/2009 | Boudah | G09F 15/00 705/14.71 |
| 2012/0072950 | A1 | 3/2012 | Wu et al. | |

(Continued)

FOREIGN PATENT DOCUMENTS

CN    104750832 A    7/2015

OTHER PUBLICATIONS

United States Patent and Trademark Office, International Search Report and Written Opinion, dated Mar. 18, 2020, 9 pages.

(Continued)

*Primary Examiner* — Vincent M Cao

(57) ABSTRACT

Embodiments of the invention overcome the shortcomings of prior art by transforming the understanding of how different creative placements and location helps drive sales and other KPIs to a computerized methodology that may allow advertising planners and buyers to generate plans that meet these expectations on effectiveness of their advertising campaign. Aspects of the invention fusing the "probability of exposure" estimates with segment level data to provide layers of intelligence in determining the probability estimates for sales conversion or other KPIs. Moreover, aspects of the invention may predict based on various models the reach and frequency relationship tradeoff for different impression levels.

20 Claims, 12 Drawing Sheets

(56) References Cited

U.S. PATENT DOCUMENTS

| | | | |
|---|---|---|---|
| 2012/0203629 A1* | 8/2012 | Warrum | G06Q 30/0251 |
| | | | 705/14.49 |
| 2012/0268485 A1* | 10/2012 | Icho | G06F 16/29 |
| | | | 345/629 |
| 2014/0074591 A1 | 3/2014 | Allen | |
| 2014/0109123 A1* | 4/2014 | Balakrishnan | G06Q 30/0244 |
| | | | 725/14 |
| 2015/0081617 A1* | 3/2015 | Shaik | G06Q 30/0241 |
| | | | 707/602 |
| 2016/0364740 A1* | 12/2016 | Parker | G06Q 10/105 |
| 2017/0323332 A1* | 11/2017 | Brixius | G06Q 30/0246 |
| 2018/0091850 A1 | 3/2018 | Sandholm | |
| 2018/0181616 A1 | 6/2018 | Patel et al. | |
| 2018/0330403 A1 | 11/2018 | Olivieri | |

OTHER PUBLICATIONS

International Preliminary Report on Patentability for App. No. PCT/US2019/069091, dated Jun. 16, 2021, 8 pages.

\* cited by examiner

OUT-OF-HOME CAMPAIGN INTELLIGENCE

CROSS-REFERENCE TO RELATED APPLICATION

This is a US non-provisional application claiming priority to provisional application Ser. No. 62/787,241, filed on Dec. 31, 2019, whose disclosure is incorporated by reference herein in its entirety.

BACKGROUND

The increasing efficiency of digital and mobile advertising to target high-value audiences is driving increased expectations in other, more traditional, forms of media. In addition, advertising capability on "home" advertising is increasingly broad and more extended due to the omnipresence of mobile devices, such as smartphones, tablets, smart watches, etc. There is still a void left regarding more traditional advertising avenues.

In out-of-home (OOH) advertising targets, such as those physical billboards or advertising spaces in airports, on buses, in railway stations, etc., there is an increasing demand for control over who sees each impression on these physical advertising spaces. In one aspect, advertisers are asking with more granular audience estimates by advertising space providers. In studies, companies have conduct extensive travel studies, tracking the daily movements of large samples of participants and overlaying them with geographical locations of available inventory of these physical advertising spaces. Combined with viewability estimates, these providers can model the likeliness of an individual to be exposed to any particular billboard or signage. In other words, these providers can estimate the "probability of exposure" of these physical advertising spaces.

However, improved audience estimation is a big step forward, advertisers, media planners, and buyers want to go further. Customers in this space want the ability to generate advertising campaigns or plans that meet the execution capabilities of digital advertising. Currently, it is time-consuming to piece individual sets of data to derive at a "reach factor"—the factor or metrics that combines the set of data and the algorithmic approach to provide a recommendations to the customers or buyers of OOH advertising. That is, there are shortcomings in blending the intelligence in placing the physical advertising space and capabilities of digital advertising. Buyers of advertisements on these physical spaces are still left with little control that they enjoy with other digital advertising to choose the right billboard placements that will achieve the highest reach and those placements that will drive more sales.

SUMMARY

Embodiments of the invention overcome the shortcomings of prior art by transforming the understanding of how different creative placements and location helps drive sales and other KPIs to a computerized methodology that may allow advertising planners and buyers to generate plans that meet these expectations on effectiveness of their advertising campaign. Aspects of the invention fusing the "probability of exposure" estimates with segment level data to provide layers of intelligence in determining the probability estimates for sales conversion or other KPIs. Moreover, aspects of the invention may predict based on various models the reach and frequency relationship tradeoff for different impression levels.

Embodiments of the invention build a recommendation engine that may combine these model estimates with an optimization procedure that is custom built for each scenario.

BRIEF DESCRIPTION OF DRAWINGS

Persons of ordinary skill in the art may appreciate that elements in the figures are illustrated for simplicity and clarity so not all connections and options have been shown to avoid obscuring the inventive aspects. For example, common but well-understood elements that are useful or necessary in a commercially feasible embodiment may often not be depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein may be defined with respect to their corresponding respective areas of inquiry and study except where specific meanings have otherwise been set forth herein.

DETAILED DESCRIPTION

Embodiments of the present invention may now be described more fully with reference to the accompanying drawings, which form a part hereof, and which show, by way of illustration, specific exemplary embodiments by which the invention may be practiced. These illustrations and exemplary embodiments may be presented with the understanding that the present disclosure is an exemplification of the principles of one or more inventions and may not be intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods, systems, computer readable media, apparatuses, or devices. Accordingly, the present invention may take the form of an entirely hardware embodiment, an entirely software embodiment, or an embodiment combining software and hardware aspects. The following detailed description may, therefore, not to be taken in a limiting sense.

According to one embodiment, aspects of the invention may optimize a targeted impression in assisting a user to determine advertisement placement on physical displace spaces. In one embodiment, the physical display spaces include billboards, wall spaces on the exterior of buildings, exterior of water tanks or HVAC systems, signage bus stop shelters, transportation signs, airport signs, street furniture or guideposts, and other out-of-home (OOH) placements. In one example, the OOH may not be considered as home related display spaces, such as displays in condo or co-op building bulletin boards, etc. As such, embodiments of the invention are directed to technical solutions to technical problems involving the lack of useful and relevant information and data related to these OOH physical display spaces. In another aspect, embodiments of the invention provide the recommendation as a function of one or more models or algorithmic expressions discussed below.

Figure 1:
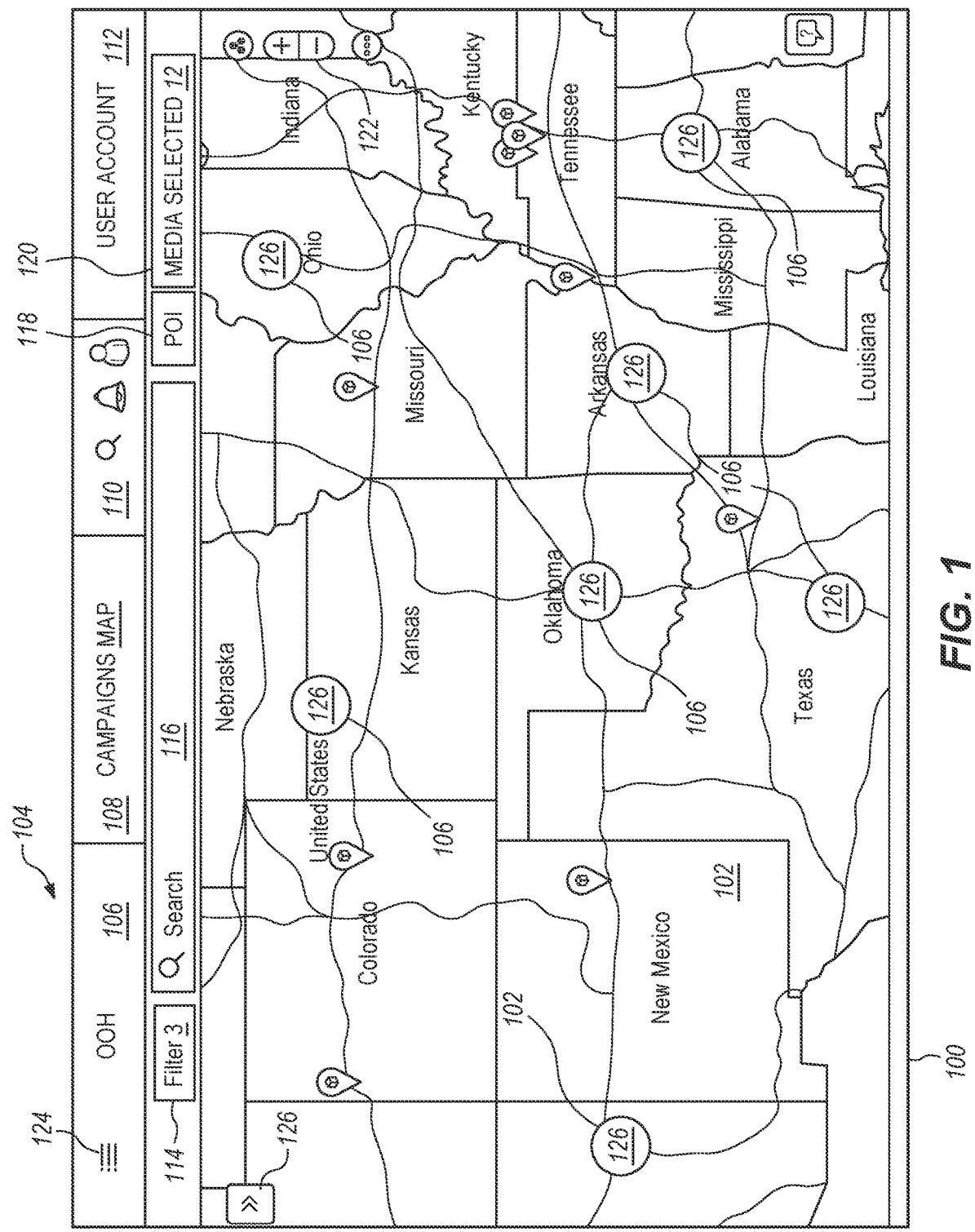
FIG. 1 is a screenshot illustrating an overall graphical user interface (GUI) according to one embodiment of the invention.

For example, FIG. 1 illustrates a screenshot showing a graphical user interface (GUI) 100 according to one embodiment of the invention. For example, the GUI 100 includes a map area 102 and a menu bar area 104. For example, the menu bar 104 includes a header section 106, a toggle section 108, a quick action section 110, and a user account section 112. For example, the map area 102 illustrates a map of a relevant geographical area where the advertising campaigns would be placing. In another embodiment, the map area 102 may include zoom in and zoom out functions 122 to enable the user to magnify views or decrease views of the map area 102 while the menu bar area 104 is not affected by the viewing actions of the user. In one embodiment, the GUI 100 further includes indicators 106 around each respective region relating to a number of the physical display spaces available in a given region.

For example, the indicator 106 may indicate a total number of physical display spaces in a given state or a city. In another embodiment, the indicator 106 may indicate a number of available physical display spaces in a given geographical region. In a further embodiment, the indicator 106 may include a number portion and an indicia portion. For example, the number portion may show the numeric value of the indicator 106. The indicia portion may be in represented as a circle. In one embodiment, the size of the indicia portion may be proportionate to the numeric value. For example, there may be a relative scale of sizes of the number of physical display spaces among the different regions within a given display screen size. As such, a size of the indicia portion may be proportion compared to other ones shown within the given display screen size. In other words, the size of the indicia portion may be dynamic as the user increase or decrease the size of the display screen on his or her mobile devices. This would greatly enhance the relative ease of navigating and identifying the needs of the user. In another embodiment, the indicia portion's size may be based on a static scale. For example, the GUI 100 may define a first size of the indicia portion for a region having 0 to 100 physical display spaces; a second size of the indicia portion for a region having 101 to 200 physical display spaces; and a third size of the indicia portion of a region having 201 to 300 physical display spaces. It is to be understood that other scale definition may be created without departing from the scope or spirit of embodiments of the invention.

In one example, a menu dropdown indicator 124 in the header section 106 may display additional menu options in response to instructions or activations via an input device. The toggle section 108, for example, may toggle display of campaign information in response to a user selection of "CAMPAIGNS" in the toggle section 108 or a map information by selecting "MAP" in the toggle section 108. In one embodiment, a line may be shown underneath "CAMPAIGNS" or "MAP" in response to the user selection. In another embodiment, the GUI 100 may include a pull tab 126 to slide an additional window or pane to cover a part of the map 102 to display additional information (to be discussed below). The quick action section 110 may include one or more shortcuts or frequently used actions, such as a search button, a reminder button, or a user account button. The user account section 112 may display the name of the user account. In another embodiment, the user account section 112 may display a location or a region that corresponds to the region or location shown in the map 102.

The GUI 100 further may include a search section that includes a filter button 114, a search bar 116, a point of interest (POI) button 118, and a media selection button 120. In one embodiment, the sections 114, 116, 118 or 120 of the search section may be displayed in response to having the map 102 displayed as the functions of the sections 114, 116, 118 or 120 may be relevant to the map 102. In another embodiment, the search section may be sliding in or out from the menu bar area 104 as needed. It is to be understood that other approaches to display the search section may be employed without departing from the scope or spirit of embodiments of the invention. In one embodiment, the sections 114, 116, 118, and 120 provide functionalities to the user to identify in the map 102 one or more physical display spaces.

In one embodiment, the GUI 100 may enable the user to select, for example, from the menu dropdown indicator 124. For example, the user may:

Select target audience to optimize impressions;
Enter a budget to constrain optimization;
Enter desirable Locations (City/Town, Conurbation, DMA/TV Areas);
Enter desirable Media Formats (Size or format of the placement); and
Enter Media Owners (Particular vendors that the team would prefer to work with).

Figure 2:
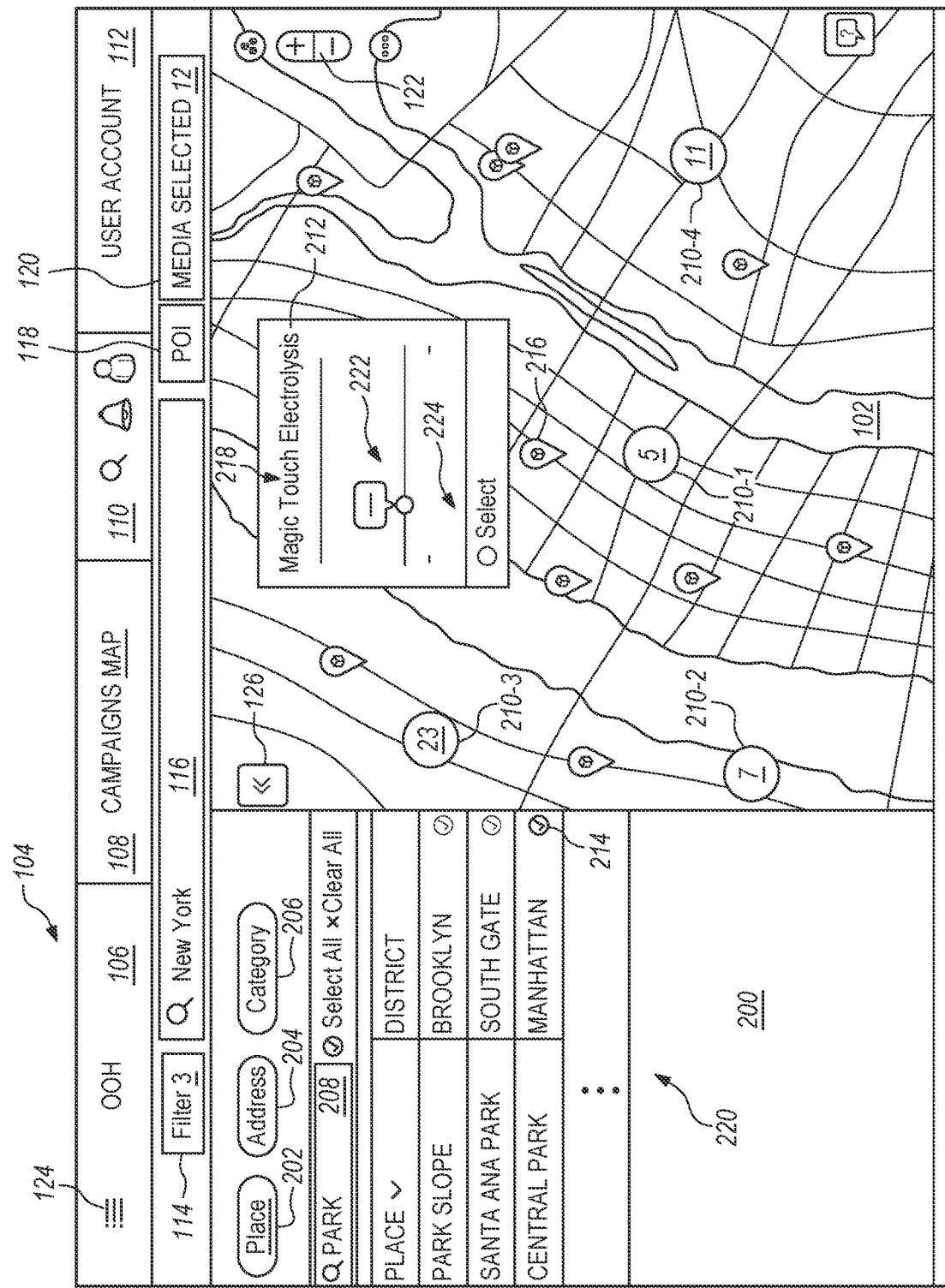
FIG. 2 is a screenshot illustrating a GUI according to another embodiment of the invention.

For example, referring to FIG. 2, in response to the user selecting the pull tab 126 to present additional GUI elements in a new GUI 200 to further navigate through the GUI 100. For example, the user may first search for a general region or area, such as a city of "New York" in the search bar 116. In addition to the general query term in the search bar 116, the user may further select finer options, such as whether the user wishes to identify the physical display spaces near a "Place" 202, based on an "Address" 204, or based on a "Category" 206. In one embodiment, the user may select the "Place" 202 (as indicated visually by the underline), the user may further enter the kind of place. In one embodiment, the user may enter "Park" in a search bar 208 of the GUI 200. The GUI 200 may further provide additional GUI elements such as "SELECT ALL," or "CLEAR ALL" for the user to edit the search term in the search box 208. In one embodiment, the GUI 200 further provides a portion 220 for displaying results in response to the query entered by the user in the search box 208. For example, as illustrated in FIG. 2, the portion 220 includes a list of results such as the following:

Park Slope in Brooklyn district;
Santa Ana Park in South Gate district; and
Central Park in Manhattan district.

In one embodiment, the GUI 200 further includes a selector 214 to further or narrow the size of the results. In such embodiment, the map 102 correspondingly may display the physical display spaces that satisfy the search query criteria. Aspects of the invention enhance the "reachability" factor or metrics that enable the customers or buyers to make the decision to purchase advertising at one or more OOH spaces. Embodiments of the invention provide an intuitive graphical user interface for the user to obtain the information to make the final determination.

In this embodiment, after the search queries in the search bar 116 and the search box 208 and in response to the selection 214, the map 102 section of the GUI 100 may provide a pinpoint indicator 216. In one example, the pinpoint indicator 216 may be one of the results from the users queries. In another embodiment, the pinpoint indicator 216 may be responsive to the user selection (e.g., either clicking on it or hovering over the indicator 216). Upon selection, for example, the map 102 may further generate another floating GUI element 212 showing details about the pinpoint indicator 216. For example, the GUI element 212 may display a name and an address via 218 of the pinpoint indicator 216. The GUI element 212 may further provide an interactive sliding GUI element 222 to enable the user to identify or filter related physical display spaces in a certain proximity to the pinpoint indicator 216. For example, the user may slide the sliding GUI element 222 to increase or decrease the distance in a measure of miles radius centered from the pinpoint indicator 216. In response to such adjustment of the sliding GUI element 222, the map 102 may dynamically, in real-time, or in substantially real-time provide one or more result indicators 210 showing both a number of physical display spaces that satisfy the regional requirements defined by the user and the similarity between the pinpoint indicator 216 and the others. In the example shown in FIG. 2, the user has slid the sliding GUI element 222 to indicate the user wishes to know about physical display spaces in a 3 mile radius from a location of the pinpoint indicator 216.

In one embodiment, each of the result indicators 210 may display a numerical portion and an indicia portion. For example, the map 102 may display the result indicator 210-1 having a value of 5 whereas the result indicator 210-2 has a value of 7. In one embodiment regarding the result indicator 210-1, the numerical value of "5" may indicate that there are 5 OOH physical display spaces within 3 miles from the location of the pinpoint indicator 216 where the location of the pinpoint indicator 216 itself are in a proximity to a park in the Central Park area in Manhattan of New York City.

In presenting such intuitive interface, aspects of the invention collect and extrapolate data that include at least one or more of the following:
Probability of exposure estimates (may come from third party data aggregator or sources);
Total Audience population;
Placement Availabilities; and
Pricing/Cost per placement.

In addition, embodiments provide additional data for the user in a relatively intuitive GUI experience.

Figure 3:
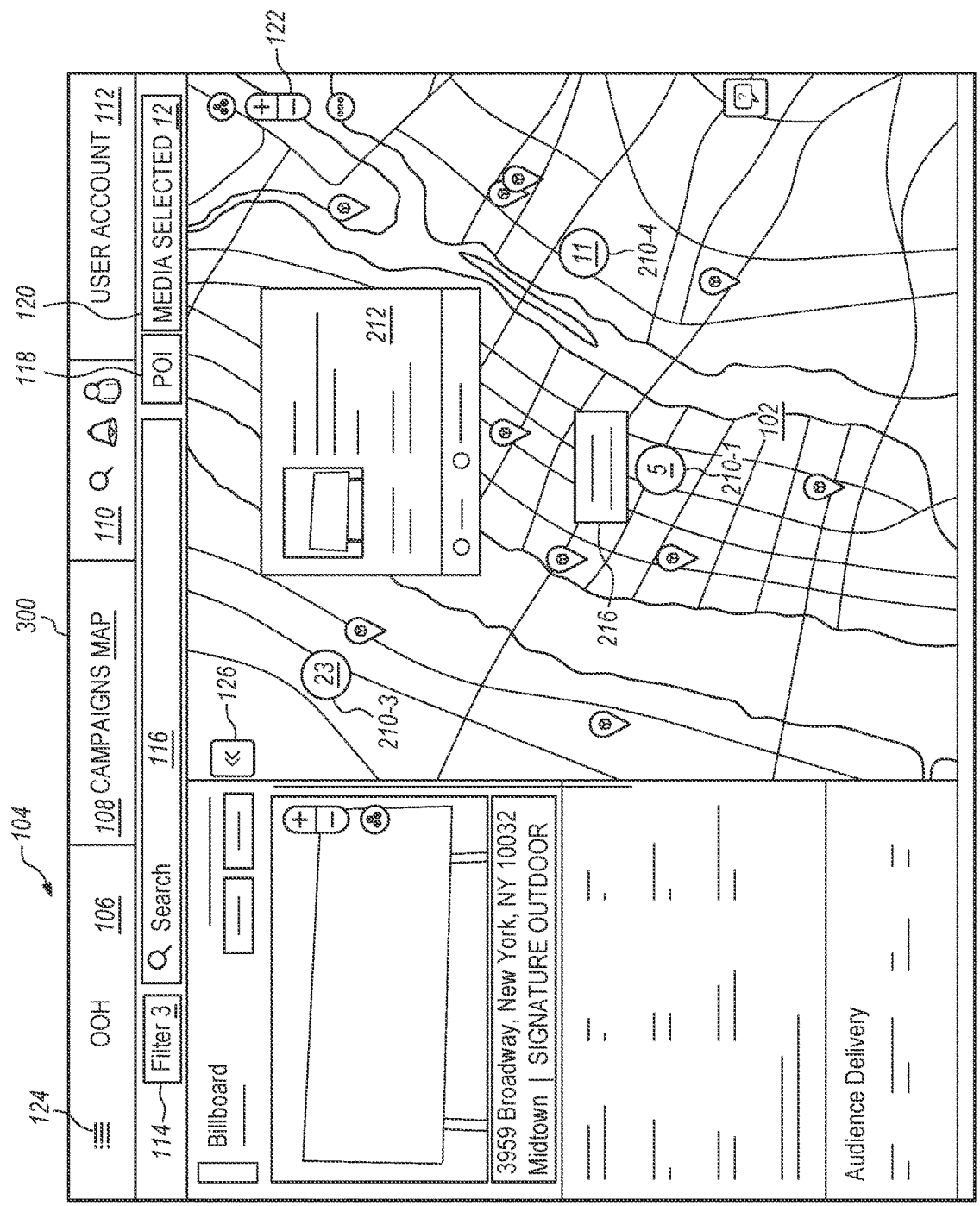
FIG. 3 is another screenshot illustrating another GUI according to another embodiment of the invention.

For example, referring now to FIG. 3, another GUI 300 shows another aspect of the invention. For example, the GUI 300 may be presented to the user in response to user instructions to the pinpoint indicator 216 or one of the result indicators 210, such as the result indicator 210-1.

Figure 4:
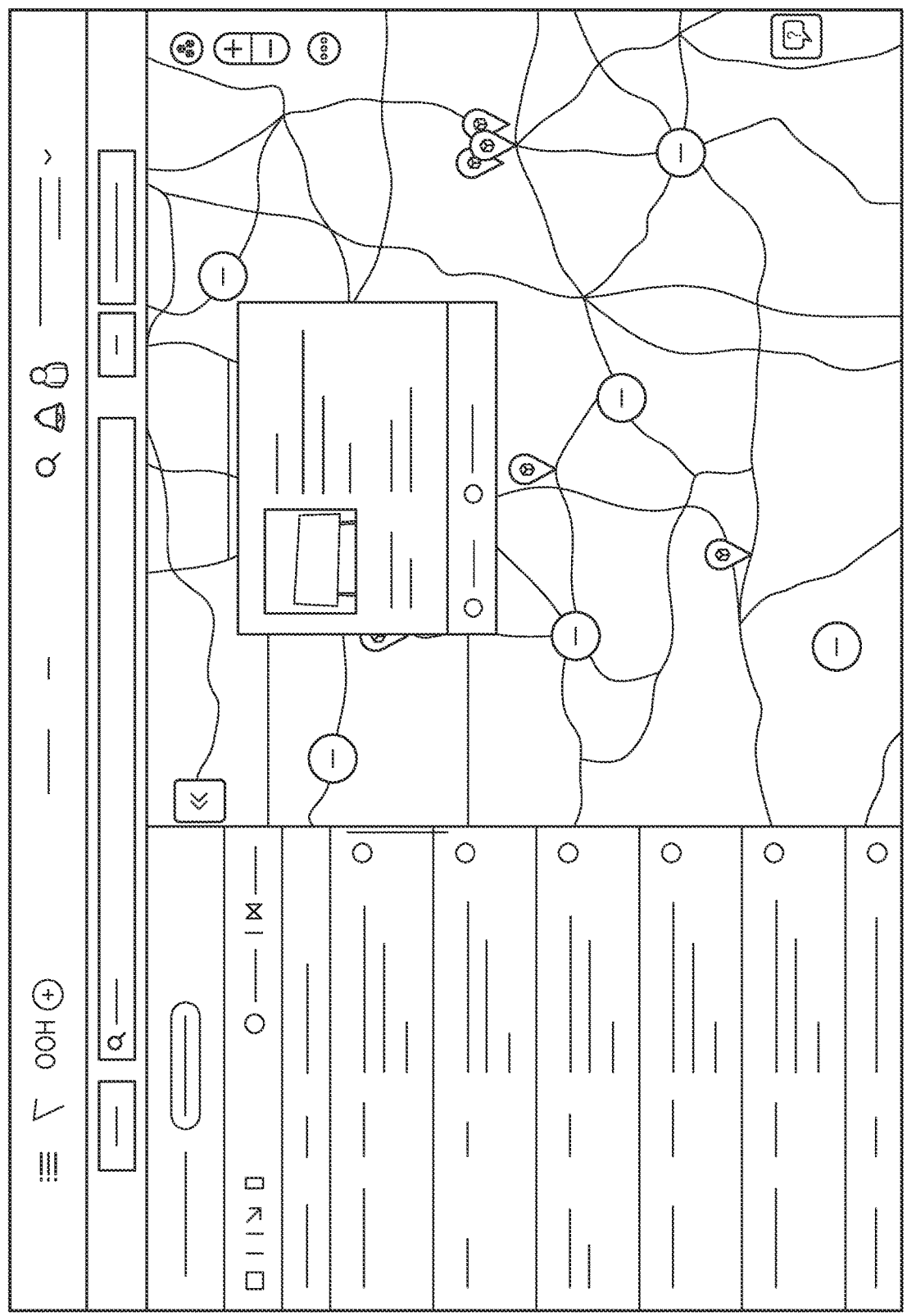
FIGS. 4 to 10 are additional screenshots illustrating GUIs according to one embodiment of the invention.

Referring now to FIG. 4, another GUI illustrating one aspect of the invention. For example, a pane of the GUI on the left showing one or more frames (e.g., "JCDecaux Portrait 2395 Broadway St., Sunnyvale, Calif. 95125, United States") that are available. A checkmark indicator next to each frame may indicate whether the frame has been selected. All frames selected will appear in the My Selection section on the right of the GUI which can be invoked by clicking on "Show Selected" button in top right corner.

Figure 5:
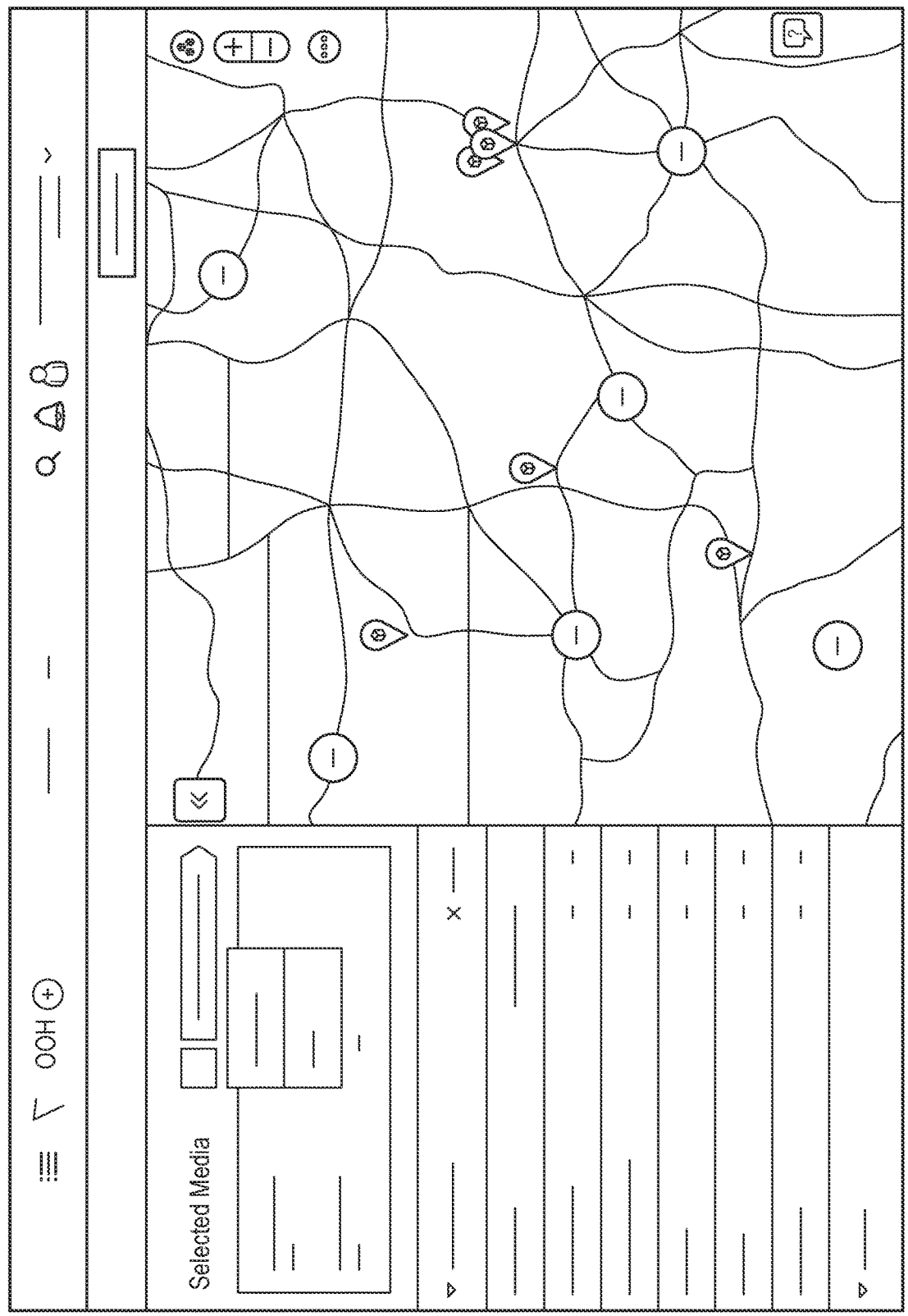
Figure 6:
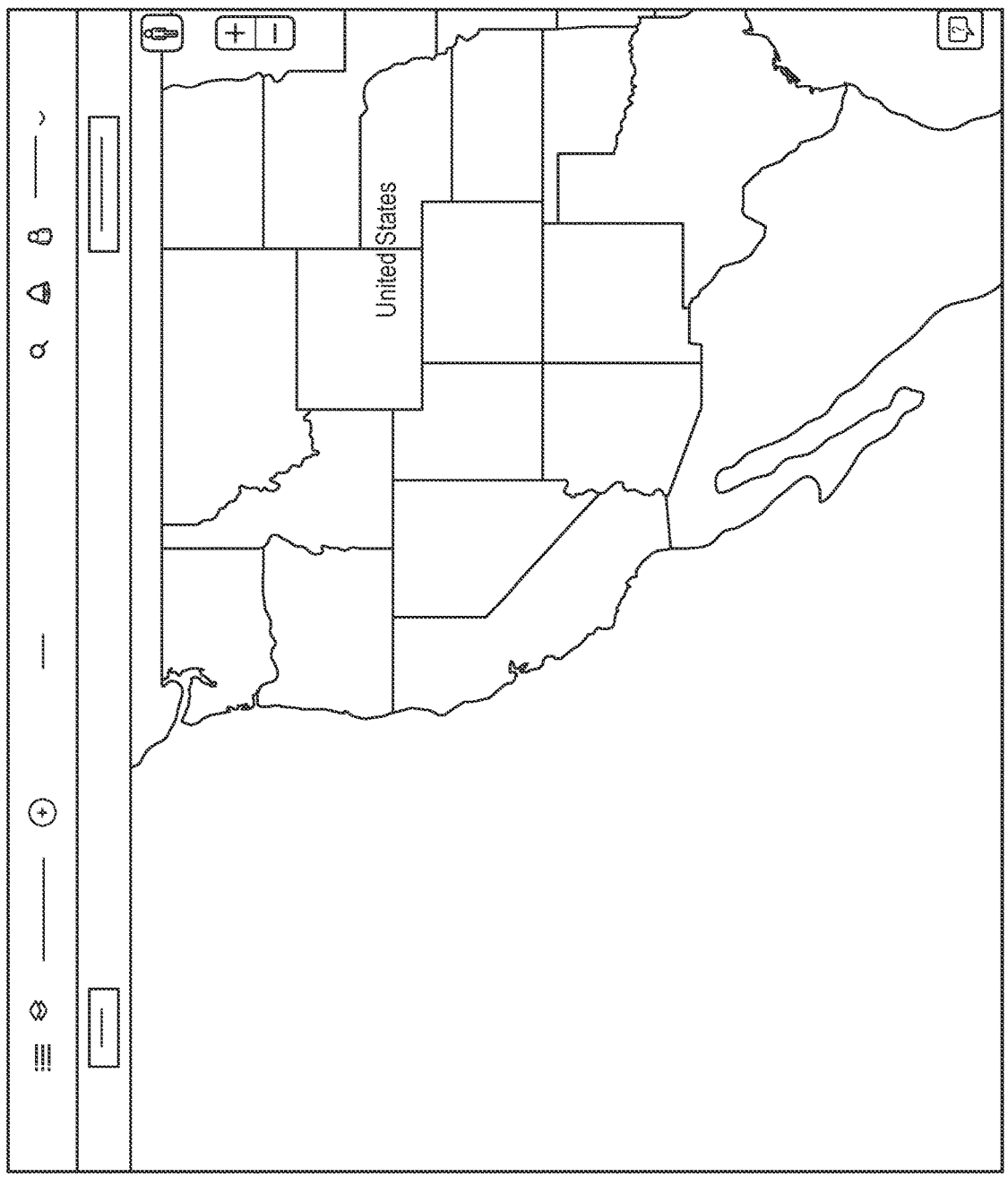
Figure 7:
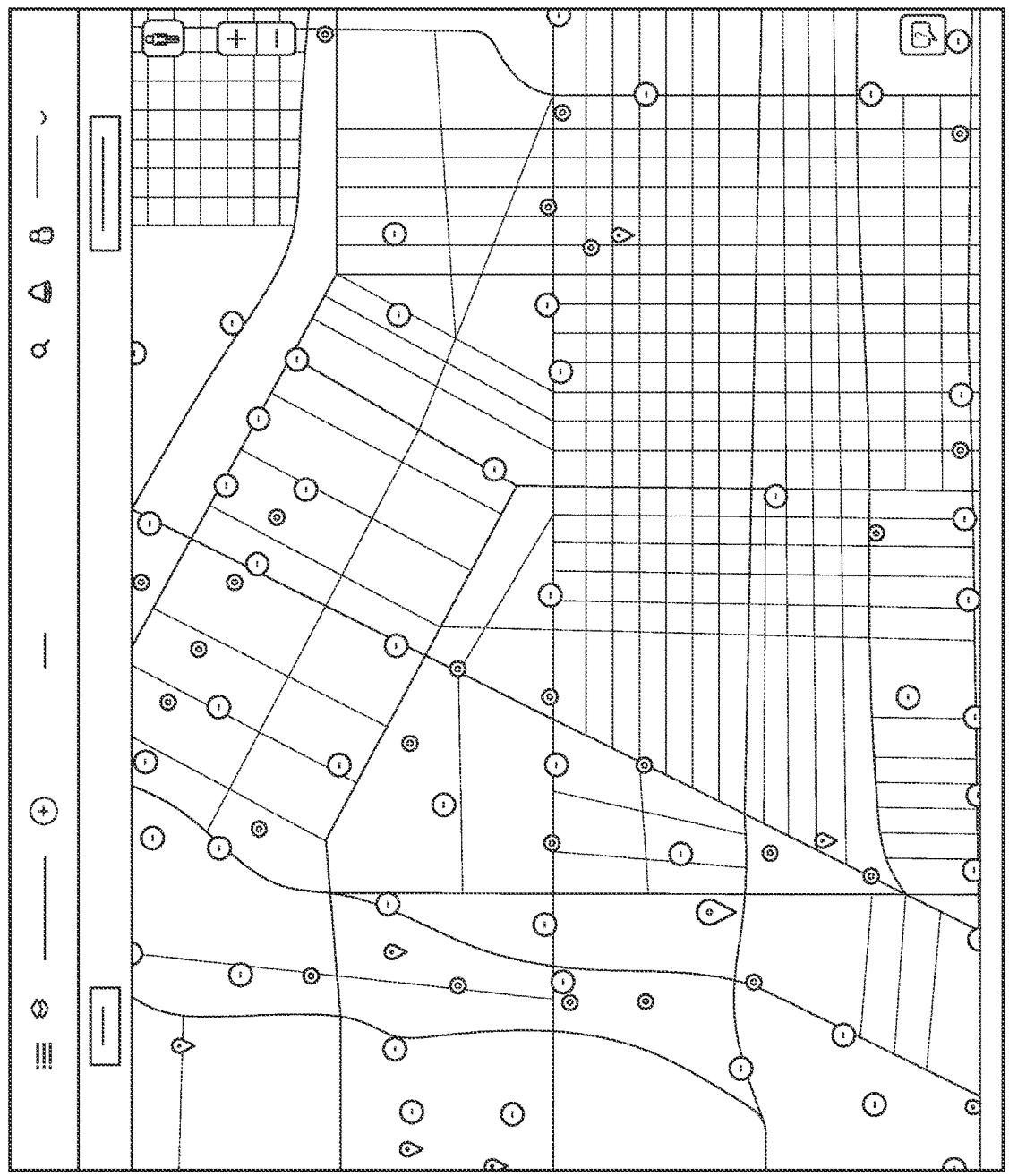
Figure 8:
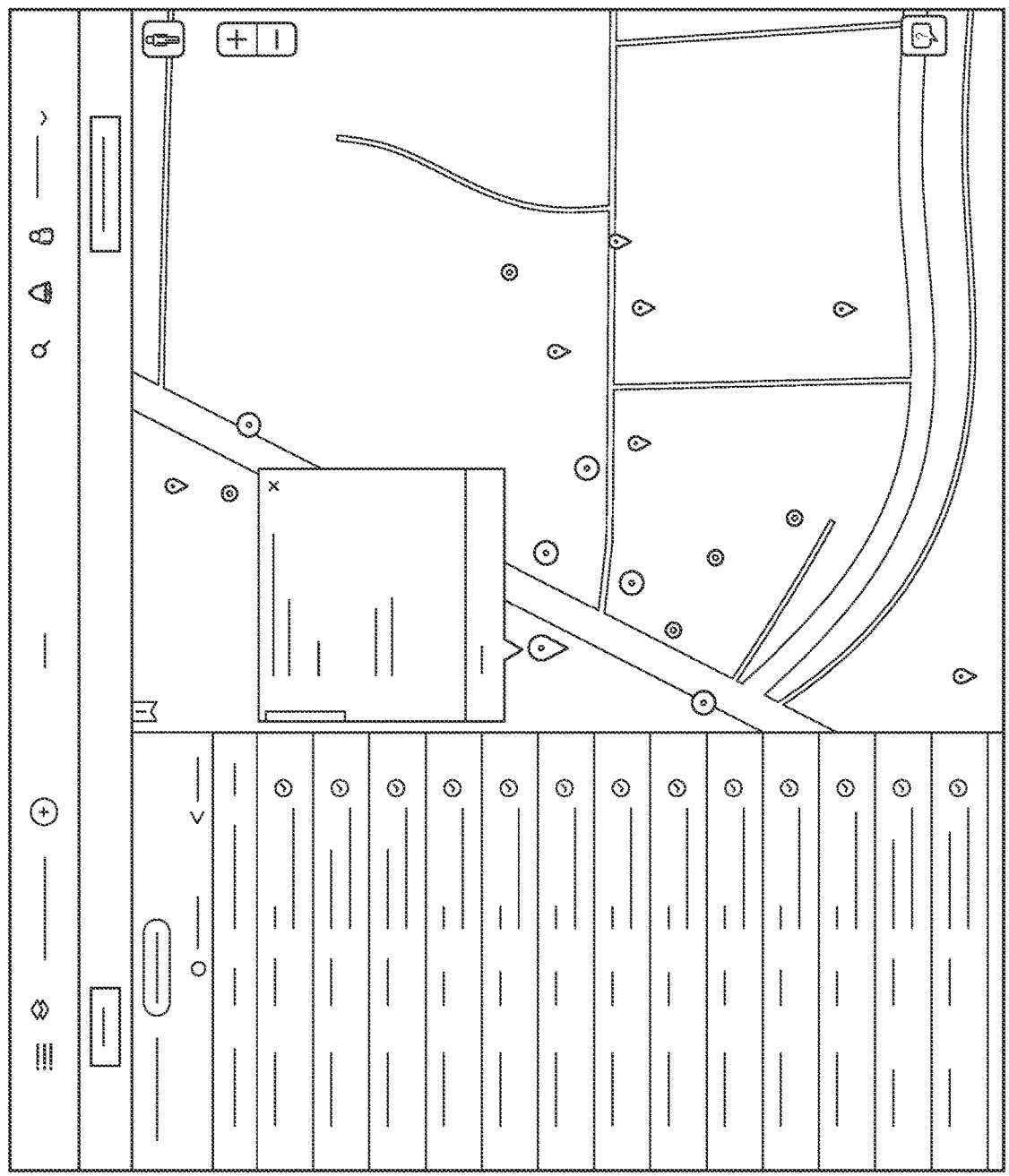
Figure 9:
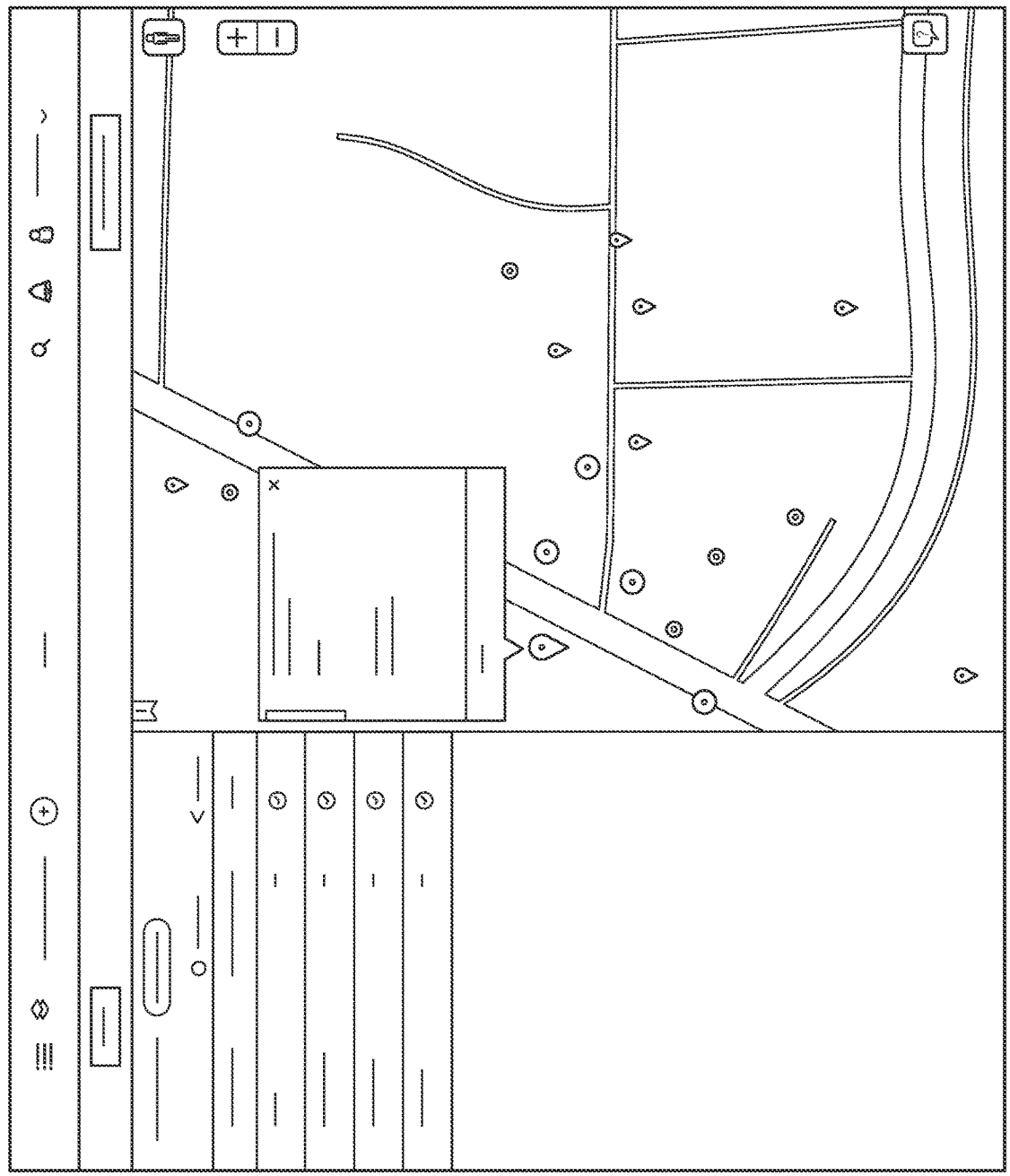
Figure 10:
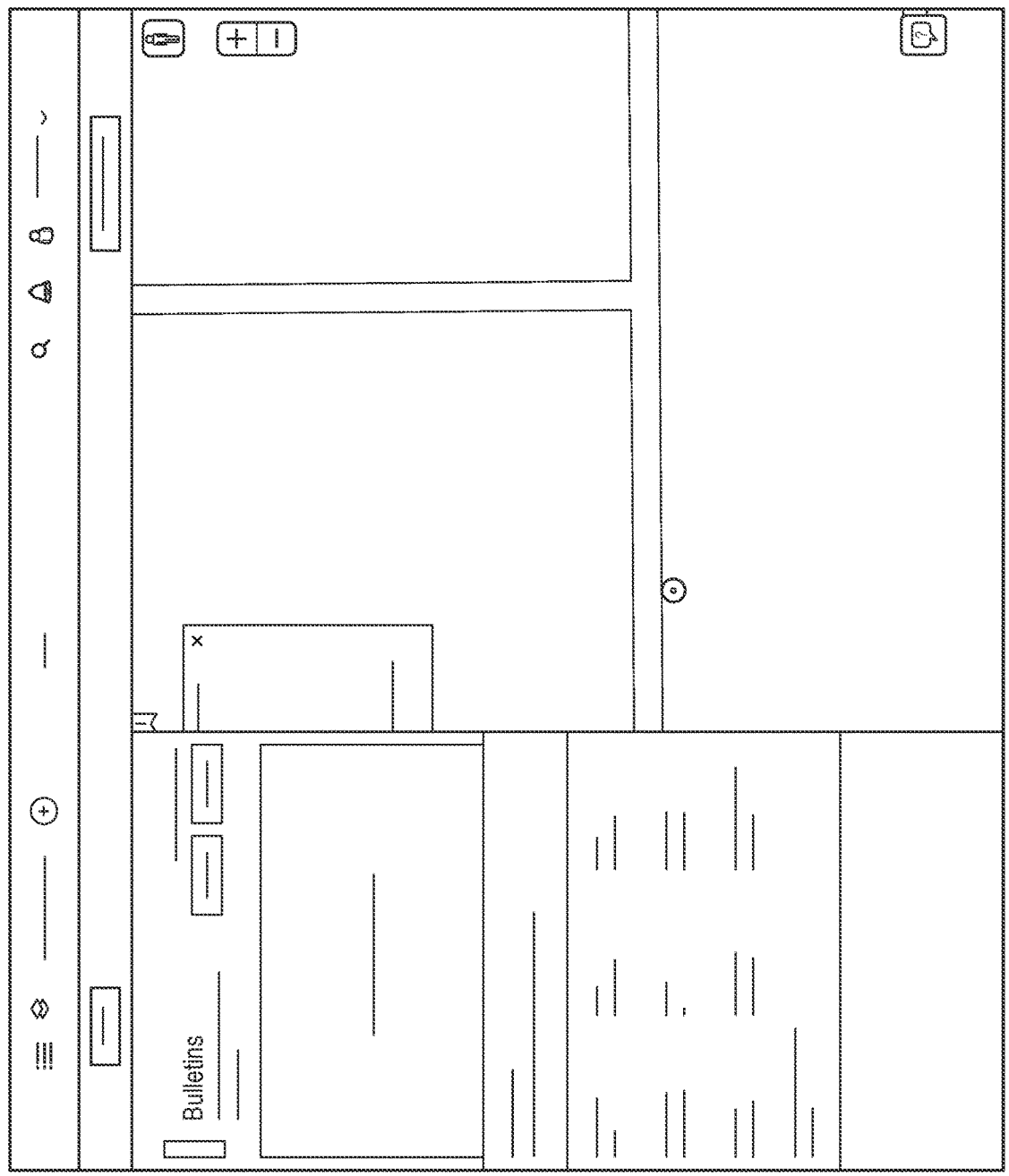

In another example, FIG. 5 may illustrate another GUI according to one embodiment. For example, on the lower half of the pane of the GUI in FIG. 5, a section may indicate a number of frames owned by each media owners. On the right hand side of the GUI (e.g., a map), a my selection area may indicate a number of frames that are selected by the user (e.g., on the left pane) for each of the media owners. For example:

Case 1: Planners or advertising campaign managers may not be interested in any specific frame and would like either media owners to make suggestion or media owners to send all frames available;

Case 2: Planners or advertising campaign managers may not be interested in specific frames based on their preference from previous campaigns;

Case 3: Planners or advertising campaign managers for most part may not be interested in specific frames but there is one in front of a competitor location or an event location that they are interested. So they select some media owners and also express interest in a specific frame.

FIGS. 6-10 are further illustrations of FIGS. 1-5 in response to zooming in and zooming out of the map section of the GUI in FIGS. 1-5.

Model:

$I_p$ = Impressions per placement (targeted)

$S_p$ = Spend per placement $Bg$ = Total Budget $CPM_p$ = Cost for 1000 impressions per placement $$\text{maximize}\left(\sum_{p=1}^{p=n} I_p\right)$$

where $I_p = \dfrac{S_p}{CPM_p} * 1000$ subject to: $\sum_{p=1}^{p=n} S_p = Bg$

Optimization:

In one embodiment, this optimization may employ a Simplex method via the commercial solver engine such as the software program developed by CPLEX.

Scenario 2: Optimize Targeted Reach

Product Details:
User selects target audience to optimize Reach.
User enters a budget to constrain optimization.
User enters desirable Locations (City/Town, Conurbation, DMA/TV Areas)
User enters desirable Media Formats (Size or format of the placement)
User enter Media Owners (Particular vendors that the team would prefer to work with)

Desirable Dataset:
Probability of exposure estimates (may come from third party data aggregator or sources);
Total Audience population;
Placement Availabilities; and
Pricing/Cost per placement.

Model:
R=Total Reach
$\alpha_p$, $\beta_p$=Reach model parameters (NBD model)
$I_p$=Impressions per placement (targeted)
$S_p$=Spend per placement
$Bg$=Total Budget
$CPM_p$=Cost for 1000 impressions per placement
maximize(R)

where:

$$R = F(I_p, \alpha_p, \beta_p)$$

$$I_p = \frac{S_p}{CPM_p} * 1000$$

subject to:

$$\sum_{p=1}^{p=n} S_p = Bg$$

Optimization:

This optimization uses monte-carlo simulation and mean-variance portfolio (generalized Markowitz model) optimization techniques. In one embodiment, this optimization may employ a Simplex method via the commercial solver engine such as the software program developed by CPLEX.

Scenario 3: Optimize Targeted KPI (Sales, Awareness)

Product Details:

User selects target audience to optimize KPI (Sales, Awareness).

User enters a budget to constrain optimization.

User enters desirable Locations (City/Town, Conurbation, DMA/TV Areas)

User enters desirable Media Formats (Size or format of the placement)

User enter Media Owners (Particular vendors that the team would prefer to work with)

Desirable Dataset:

Audience modelling for relationship of Billboard frequency to probability of impact, including drivers for Geography and location, Age, Income, Ethnicity, Occupation, Religion Probability of exposure estimates (may come from third party data aggregator or sources);

Total Audience population;

Placement Availabilities; and

Pricing/Cost per placement.

Model:

Imp=Total Impact

R=Total Reach $\gamma$=Impact model parameter $\alpha_p$, $\beta_p$=Reach model parameters (NBD model)

$I_p$=Impressions per placement (targeted)

$S_p$=Spend per placement

Bg=Total Budget $CPM_p$=Cost for 1000 impressions per placement maximize(R)

where:

$$I = F(R, \gamma)$$

$$R = F(I_p, \alpha_p, \beta_p)$$

$$I_p = \frac{S_p}{CPM_p} * 1000$$

subject to:

$$\Sigma_{p=1}^{p=n} S_p = Bg$$

Optimization:

This optimization uses monte-carlo simulation and mean-variance portfolio (generalized Markowitz model) optimization techniques. In one embodiment, this optimization may employ a Simplex method via the commercial solver engine such as the software program developed by CPLEX.

APPENDIX: OUTLINE OF MEAN VARIANCE OPTIMIZATION MODEL

Our optimization 'decision variable' vector I=[i1, i2, . . . , iN]', where iN is the number of placements to be displayed in the billboard N.

The cost of each placement is the vector C=[c1, c2, . . . , cN]'. The total cost of schedule c is:

$$\text{Total Cost} = \Sigma_{p=1}^{N} I_p C_p$$

The objective function is the 'expected outcome' per KPI. Ie for in scenario 2 it will be the 'reach' or the number of exposures per individual. For scenario 3 it would be sales conversions or awareness per individual in the population:

$$\text{Expected Outcome} = \hat{e}(kpi_{ind})$$

The variance and standard deviation of the outcome are obtained by:

$$\hat{\sigma}^2(kpi_{ind}) = I'\text{Cov } I \text{ and } \hat{\sigma}(kpi_{ind}) = \sqrt{\hat{\sigma}^2(kpi_{ind})}$$

Where 'Cov' is the matrix of estimated covariances among exposures to billboard placements With normal assumptions, a 67% of confidence interval gives the average approximation of KPI per individual to be [kpi−sd, kpi+sd].

As such if two media buys present equal or similar estimated outcome—we should prefer the media buy in which the variance is lower, as there is greater likelihood of the expected outcome being realized.

Such that the optimization involves maximizing the objective function $$arg \max(kpi_{ind}) = \alpha \hat{e}(kpi_{ind}) - \sigma^2(kpi_{ind})$$

Subject to the user constraints.

Figure 11:
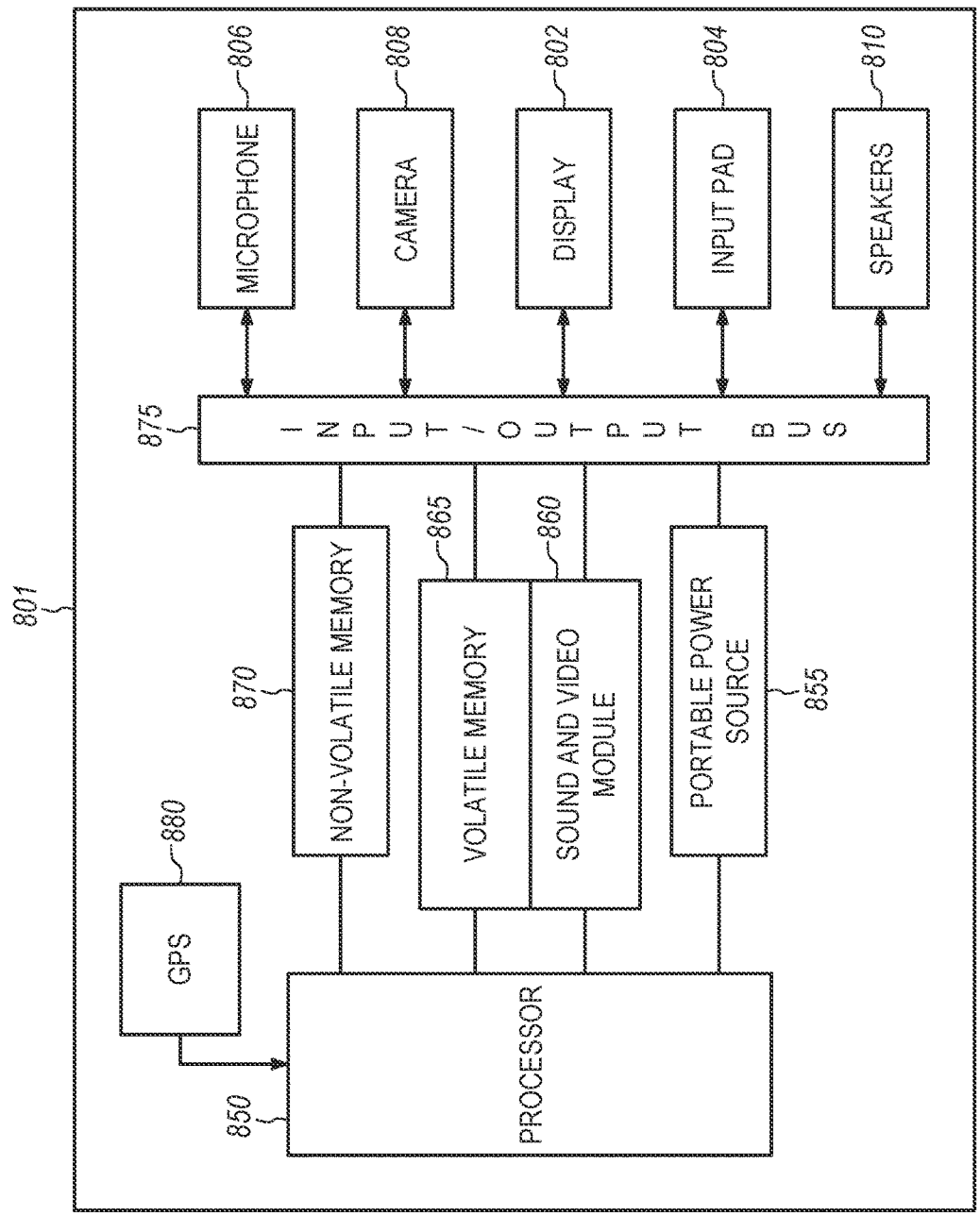
FIG. 11 is a diagram illustrating a portable computing device according to one embodiment of the invention.

FIG. 11 may be a high level illustration of a portable computing device 801 communicating with a remote computing device 841 but the application may be stored and accessed in a variety of ways. In addition, the application may be obtained in a variety of ways such as from an app store, from a web site, from a store Wi-Fi system, etc. There may be various versions of the application to take advantage of the benefits of different computing devices, different languages, and different API platforms.

In one embodiment, a portable computing device 801 may be a mobile device 112 that operates using a portable power source 855 such as a battery. The portable computing device 801 may also have a display 802 which may or may not be a touch sensitive display. More specifically, the display 802 may have a capacitance sensor, for example, that may be used to provide input data to the portable computing device 801. In other embodiments, an input pad 804 such as arrows, scroll wheels, keyboards, etc., may be used to provide inputs to the portable computing device 801. In addition, the portable computing device 801 may have a microphone 806 which may accept and store verbal data, a camera 808 to accept images and a speaker 810 to communicate sounds.

The portable computing device 801 may be able to communicate with a computing device 841 or a plurality of computing devices 841 that make up a cloud of computing devices 811. The portable computing device 801 may be able to communicate in a variety of ways. In some embodiments, the communication may be wired such as through an Ethernet cable, a USB cable or RJ6 cable. In other embodiments, the communication may be wireless such as through Wi-Fi (802.11 standard), Bluetooth, cellular communication or near field communication devices. The communication may be direct to the computing device 841 or may be through a communication network 102 such as cellular service, through the Internet, through a private network, through Bluetooth, etc. FIG. 11 may be a simplified illustration of the physical elements that make up a portable computing device 801 and FIG. 12 may be a simplified illustration of the physical elements that make up a server type computing device 841.

FIG. 11 may be a sample portable computing device 801 that is physically configured according to be part of the system. The portable computing device 801 may have a processor 850 that is physically configured according to computer executable instructions. It may have a portable power supply 855 such as a battery which may be rechargeable. It may also have a sound and video module 860 which assists in displaying video and sound and may turn off when not in use to conserve power and battery life. The portable computing device 801 may also have volatile memory 865 and non-volatile memory 870. It may have GPS capabilities 880 that may be a separate circuit or may be part of the processor 850. There also may be an input/output bus 875 that shuttles data to and from the various user input devices such as the microphone 806, the camera 808 and other inputs, such as the input pad 804, the display 802, and the speakers 810, etc. It also may control of communicating with the networks, either through wireless or wired devices. Of course, this is just one embodiment of the portable computing device 801 and the number and types of portable computing devices 801 is limited only by the imagination.

As a result of the system, better information may be provided to a user at a point of sale. The information may be user specific and may be required to be over a threshold of relevance. As a result, users may make better informed decisions. The system is more than just speeding a process but uses a computing system to achieve a better outcome.

Figure 12:
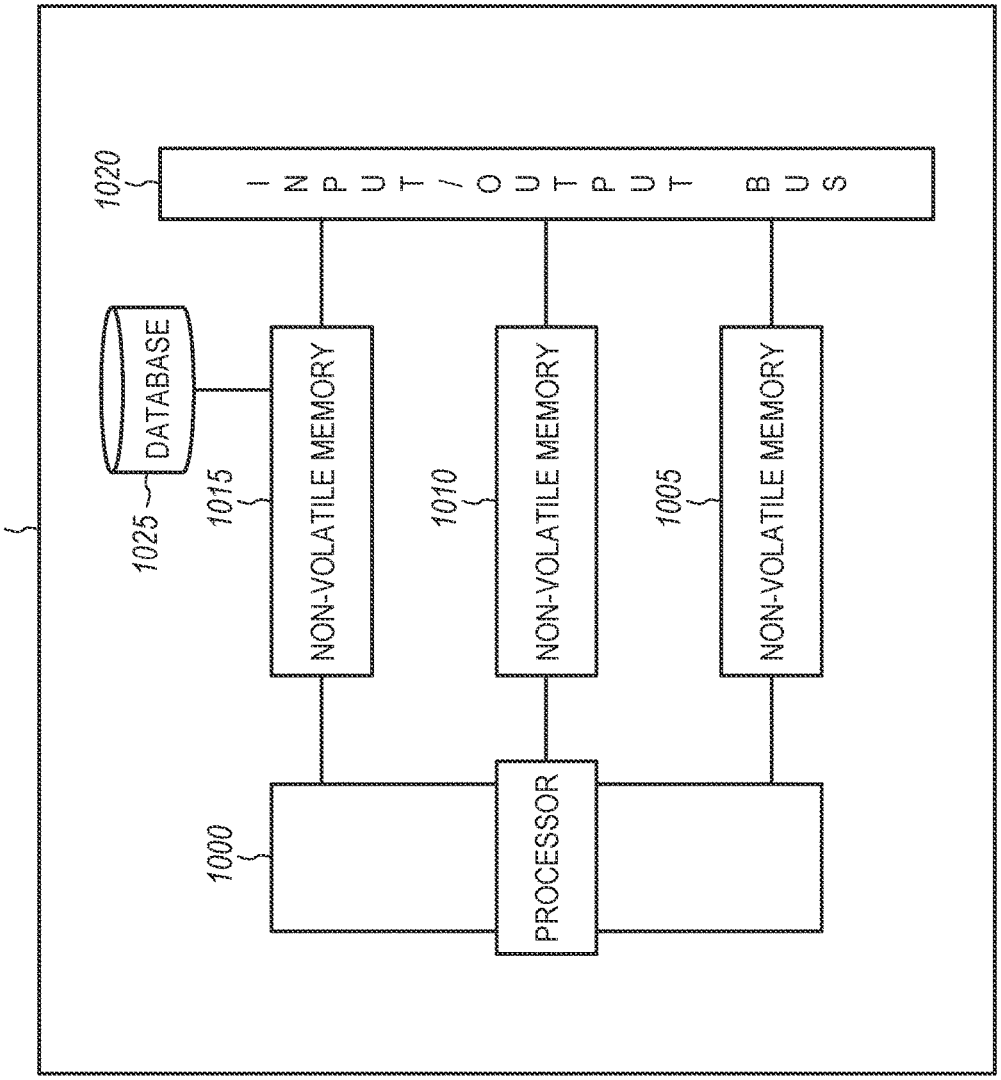
FIG. 12 is a diagram illustrating a remote computing device according to one embodiment of the invention.

The physical elements that make up the remote computing device 841 may be further illustrated in FIG. 12. At a high level, the computing device 841 may include a digital storage such as a magnetic disk, an optical disk, flash storage, non-volatile storage, etc. Structured data may be stored in the digital storage such as in a database. The server 841 may have a processor 1000 that is physically configured according to computer executable instructions. It may also have a sound and video module 1005 which assists in displaying video and sound and may turn off when not in use to conserve power and battery life. The server 841 may also have volatile memory 1010 and non-volatile memory 1015.

The database 1025 may be stored in the memory 1010 or 1015 or may be separate. The database 1025 may also be part of a cloud of computing device 841 and may be stored in a distributed manner across a plurality of computing devices 841. There also may be an input/output bus 1020 that shuttles data to and from the various user input devices such as the microphone 806, the camera 808, the inputs such as the input pad 804, the display 802, and the speakers 810, etc. The input/output bus 1020 also may control of communicating with the networks, either through wireless or wired devices. In some embodiments, the application may be on the local computing device 801 and in other embodiments, the application may be remote 841. Of course, this is just one embodiment of the server 841 and the number and types of portable computing devices 841 is limited only by the imagination.

The user devices, computers and servers described herein may be general purpose computers that may have, among other elements, a microprocessor (such as from the Intel Corporation, AMD, ARM, Qualcomm, or MediaTek); volatile and non-volatile memory; one or more mass storage devices (i.e., a hard drive); various user input devices, such as a mouse, a keyboard, or a microphone; and a video display system. The user devices, computers and servers described herein may be running on any one of many operating systems including, but not limited to WINDOWS, UNIX, LINUX, MAC OS, iOS, Android, or Windows (XP, VISTA, etc.). It is contemplated, however, that any suitable operating system may be used for the present invention. The servers may be a cluster of web servers, which may each be LINUX based and supported by a load balancer that decides which of the cluster of web servers should process a request based upon the current request-load of the available server(s).

The user devices, computers and servers described herein may communicate via networks, including the Internet, WAN, LAN, Wi-Fi, other computer networks (now known or invented in the future), and/or any combination of the foregoing. It should be understood by those of ordinary skill in the art having the present specification, drawings, and claims before them that networks may connect the various components over any combination of wired and wireless conduits, including copper, fiber optic, microwaves, and other forms of radio frequency, electrical and/or optical communication techniques. It should also be understood that any network may be connected to any other network in a different manner. The interconnections between computers and servers in system are examples. Any device described herein may communicate with any other device via one or more networks.

The example embodiments may include additional devices and networks beyond those shown. Further, the functionality described as being performed by one device may be distributed and performed by two or more devices. Multiple devices may also be combined into a single device, which may perform the functionality of the combined devices.

The various participants and elements described herein may operate one or more computer apparatuses to facilitate the functions described herein. Any of the elements in the above-described Figures, including any servers, user devices, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++, or Perl using, for example, conventional or object-oriented techniques.

The software code may be stored as a series of instructions or commands on a non-transitory computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus and may be present on or within different computational apparatuses within a system or network.

It may be understood that the present invention as described above may be implemented in the form of control logic using computer software in a modular or integrated manner. Based on the disclosure and teachings provided herein, a person of ordinary skill in the art may know and appreciate other ways and/or methods to implement the present invention using hardware, software, or a combination of hardware and software.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention. A recitation of "a", "an" or "the" is intended to mean "one or more" unless specifically indicated to the contrary. Recitation of "and/or" is intended to represent the most inclusive sense of the term unless specifically indicated to the contrary.

One or more of the elements of the present system may be claimed as means for accomplishing a particular function. Where such means-plus-function elements are used to describe certain elements of a claimed system it will be understood by those of ordinary skill in the art having the present specification, figures and claims before them, that the corresponding structure is a general purpose computer, processor, or microprocessor (as the case may be) programmed to perform the particularly recited function using functionality found in any general purpose computer without special programming and/or by implementing one or more algorithms to achieve the recited functionality. As would be understood by those of ordinary skill in the art that algorithm may be expressed within this disclosure as a mathematical formula, a flow chart, a narrative, and/or in any other manner that provides sufficient structure for those of ordinary skill in the art to implement the recited process and its equivalents.

While the present disclosure may be embodied in many different forms, the drawings and discussion are presented with the understanding that the present disclosure is an exemplification of the principles of one or more inventions and is not intended to limit any one of the inventions to the embodiments illustrated.

The present disclosure provides a solution to the long-felt need described above. In particular, the systems and methods described herein may be configured for improving verification and discovery of merchants or stores that do not accept non-cash payment devices or that do accept non-cash payments devices but differentiate them between local/national issued ones versus foreign issued ones. Further advantages and modifications of the above described system and method will readily occur to those skilled in the art. The disclosure, in its broader aspects, is therefore not limited to the specific details, representative system and methods, and illustrative examples shown and described above. Various modifications and variations can be made to the above specification without departing from the scope or spirit of the present disclosure, and it is intended that the present disclosure covers all such modifications and variations provided they come within the scope of the following claims and their equivalents.

What is claimed is:

1. A computerized system for providing a recommendation for an out-of-home campaign placement, said system comprising:
    a data store for storing data relating to one or more of the following: a probability of exposure estimates of a physical display space, a value representing a total audience population of the campaign, a value representing placement availabilities for the physical display space; and a pricing per placement of the physical display space;
    a processor, being connected via a network to the data store, configured to execute computer-readable instructions for:
    receiving a request from a user interactively and dynamically via a graphical user interface (GUI) on a user display screen, said GUI having a menu bar area and a map section, said menu bar area further including a search bar for receiving the request, wherein the request received from the user comprises references to physical addresses of the physical display space identifiable on the map section;
    wherein the GUI further comprises an indicator, wherein the indicator comprises a number portion and an indicia portion, wherein the number portion comprises a numeric value of a total number of physical display spaces in an area and the indicia portion comprises a circle within the map section, wherein the indicia portion is proportional to the numerical value of the number portion, and wherein a size of the indicia portion is dynamically altered based on a user increase or decrease in a size of the GUI on the user display screen;
    in response to receiving each piece of user desirable information for the out-of-home campaign placement received as part of the request from the user, updating the menu bar area and the map section of the GUI dynamically;
    converting the each piece of user desirable information as part of the request as parameters of a model:
    $I_p$=Impressions per placement (targeted),
    $S_p$=Spend per placement,
    $B_g$=Total Budget,
    $CPM_p$=Cost for 1000 impressions per placement, $$\text{maximize}\left(\sum_{p=1}^{p=n} I_p\right),$$

$$\text{where } I_p = \frac{S_p}{CPM_p} * 1000,$$

$$\text{subject to:} \sum_{p=1}^{p=n} S_p = B_g; \text{ and}$$

generating a recommendation based on the model; and
in response to the generated recommendation, providing one or more result indicators on the map section of the GUI.

2. The computerized system of claim 1, wherein the each piece of user desirable information as part of the request from the user comprises:
    a target audience to optimize impressions;
    a budget to constrain optimization;
    a location (City/Town, Conurbation, DMA/TV Areas);
    a media formats (Size or format of the placement); and
    a media owners.

3. The computerized system of claim 1, wherein the GUI further comprises a pull tab configured to slide an additional panel over at least a part of the map section of the GUI.

4. The computerized system of claim 3, further comprising a quick action section comprising a control for one or more shortcuts or frequently used actions.

5. The computerized system of claim 4, wherein the shortcuts or frequently used actions comprise one or more of a search button, a reminder button, and a user account button.

6. The computerized system of claim 5, further comprising a pinpoint indicator configured to identify a result from the request from the user on the map area.

7. The computerized system of claim 6, wherein the pinpoint indicator further comprises a floating element appearing on the map section of the GUI.

8. The computerized system of claim 7, further comprising an interactive sliding GUI element configured to identify or filter related physical display spaces in a certain proximity to the pinpoint indicator.

9. A computerized system for providing a recommendation for an out-of-home campaign placement, said system comprising:
   a data store for storing data relating to one or more of the following: a probability of exposure estimates of a physical display space, a value representing a total audience population of the campaign, a value representing placement availabilities for the physical display space; and a pricing per placement of the physical display space, wherein the out-of-home campaign placement comprises:
   a processor, being connected via a network to the data store, configured to execute computer-executable instructions for:
   receiving a request from a user via a graphical user interface (GUI) on a user display screen, said GUI having a menu bar area and a map section, said menu bar area further including a search bar for receiving the request;
   wherein the GUI further comprises an indicator, wherein the indicator comprises a number portion and an indicia portion, wherein the number portion comprises a numeric value of a total number of physical display spaces in an area and the indicia portion comprises a circle within the map section, wherein a size of the indicia portion is based on a static scale chosen from a plurality of physical display space sizes based on a user screen size;
   in response to receiving each piece of user desirable information for the out-of-home campaign placement received as part of the request from the user, updating the menu bar area and the map section of the GUI dynamically;
   converting the each piece of user desirable information as part of the request as parameters of a model:
   R=Total Reach,
   $\alpha_p, \beta_p$=Reach model parameters (NBD model),
   $I_p$=Impressions per placement (targeted),
   $S_p$=Spend per placement,
   $B_g$=Total Budget,
   $CPM_p$=Cost for 1000 impressions per placement,
   maximize(R),
   where:

$$R = F(I_p, \alpha_p, \beta_p),$$

$$I_p = \frac{S_p}{CPM_p} * 1000,$$

subject to:

$$\sum_{p=1}^{p=n} S_p = B_g;$$

generating a recommendation based on the model; and
   in response to the generated recommendation, providing one or more result indicators on the map section of the GUI to the user.

10. The computerized system of claim 9, wherein the each piece of user desirable information as part of the request comprises:
   a target audience to optimize reach;
   a budget to constrain optimization;
   a location (City/Town, Conurbation, DMA/TV Areas);
   a media formats (Size or format of the placement); and
   a media owners.

11. The computerized system of claim 9, wherein the GUI further comprises a pull tab configured to slide an additional panel over at least a part of the map section of the GUI.

12. The computerized system of claim 11, further comprising a quick action section comprising a control for one or more shortcuts or frequently used actions.

13. The computerized system of claim 12, wherein the shortcuts or frequently used actions comprise one or more of a search button, a reminder button, and a user account button.

14. The computerized system of claim 13, further comprising a pinpoint indicator configured to identify a result from the request from the user on the map area.

15. The computerized system of claim 14, wherein the pinpoint indicator further comprises a floating element appearing on the map section of the GUI.

16. The computerized system of claim 15, further comprising an interactive sliding GUI element configured to identify or filter related physical display spaces in a certain proximity to the pinpoint indicator.

17. A computerized system for providing a recommendation for an out-of-home campaign placement, said system comprising:
   a data store for storing data relating to one or more of the following: audience modelling for relationship of Billboard frequency to probability of impact, including drivers for Geography and location, Age, Income, Ethnicity, Occupation, Religion; a probability of exposure estimates of a physical display space, a value representing a total audience population of the campaign, a value representing placement availabilities for the physical display space; and a pricing per placement of the physical display space;
   a processor, being connected via a network to the data store, configured to execute computer-executable instructions for
   receiving a request from a user via a graphical user interface (GUI), said GUI having a menu bar area and a map section, said menu bar area further including a search bar for receiving the request;
   wherein the GUI further comprises an indicator comprising a number portion and an indicia portion, wherein the number portion comprises a numeric value of a total number of physical display spaces in an area and the indicia portion comprises a circle within the map section, wherein the indicia portion is proportional to the numerical value of the number portion, and wherein a size of the indicia portion is configurable in response to a user increase or user decrease in a size of the GUI on the user display screen;

in response to receiving each piece of user desirable information for the out-of-home campaign placement received as part of the request from the user, updating the menu bar area and the map section of the GUI dynamically;

converting the each piece of user desirable information as part of the request as parameters of a model:

Imp=Total Impact,
R=Total Reach,
$\gamma$=Impact model parameter,
$\alpha_p$, $\beta_p$=Reach model parameters (NBD model),
$I_p$=Impressions per placement (targeted),
$S_p$=Spend per placement,
$B_g$=Total Budget,
$CPM_p$=Cost for 1000 impressions per placement,
maximize(R),
where:
I=F(R, $\gamma$), $$R = F(I_p, \alpha_p, \beta_p),$$

$$I_p = \frac{S_p}{CPM_p} * 1000,$$

subject to:

$$\sum_{p=1}^{p=n} S_p = B_g;$$

generating a recommendation based on the model; and in response to the generated recommendation, providing one or more result indicators on the map section of the GUI to the user.

18. The computerized system of claim 17, wherein the each piece of user desirable information as part of the request comprises:

a target audience to optimize KPI;
a budget to constrain optimization;
a location (City/town, Conurbation, DMA/TV Areas);
a media formats (Size or format of the placement); and
a media owners.

19. The computerized system of claim 17, wherein the GUI further comprises a pull tab configured to slide an additional panel over at least a part of the map section of the GUI.

20. The computerized system of claim 19, further comprising a quick action section comprising a control for one or more shortcuts or frequently used actions.

* * * * *